July 7, 1953 A. W. LO 2,644,897

TRANSISTOR RING COUNTER

Filed Aug. 9, 1952 2 Sheets-Sheet 1

INVENTOR.
ARTHUR W. LO
BY H. C. Masten
ATTORNEY

INVENTOR.

ARTHUR W. LO

BY H. O. Newton

ATTORNEY

Patented July 7, 1953

2,644,897

UNITED STATES PATENT OFFICE 2,644,897

TRANSISTOR RING COUNTER

Arthur W. Lo, Haddonfield, N. J., assignor to Radio Corporation of America, a corporation of Delaware Application August 9, 1952, Serial No. 303,513

19 Claims. (Cl. 307—88)

This invention relates generally to bistable transistor circuits and particularly relates to a transistor ring counter employing a single current-multiplication transistor.

Various transistor circuits are known which employ a single current-multiplication transistor to provide bistable triggered circuits. A bistable circuit of this type is disclosed and claimed in the patent to Eberhard 2,533,001.

A ring counter essentially consists of a number of bistable circuits which are interconnected to form a closed loop. By connecting ten such stages in a closed loop, a decade counter is obtained which has been widely used. Various types of ring counters are known in the art. Thus, for example, the patent to R. P. Moore, Jr., 2,591,961 discloses a transistor ring counter which employs the priming method. One of the stages of the transistor ring counter is in the indicating position, that is, it is in a state of high current conduction, while the remaining stages are in a non-indicating position, that is, in the state of low current conduction. The stage in the indicating position will prime the succeeding stage so that the next input or trigger pulse will bring the primed stage into the indicating position. At the same time the stage, which previously was in the indicating position, is brought into the non-indicating position and the next succeeding stage is primed. Such a ring counter is sensitive to the priming voltage amplitude and may be unreliable under adverse conditions.

The patent to N. E. Mohr 2,594,336 also discloses a transistor ring counter which belongs in the same general class. However, in accordance with the Mohr circuit, the priming of a stage is not effected by a direct current voltage but by a transient voltage which is developed by the indicating stage. Hence, the ring counter is still sensitive to the voltage amplitude of the pulses which trigger the circuit and to the transient priming voltage. Furthermore, the circuit arrangement is such that the trigger pulses must arrive within a certain time sequence and consequently, the counter cannot count random pulses. Another type of ring counter is not sensitive to the magnitude of the trigger and priming voltage, but makes use instead of a transfer pulse. The trigger pulse is applied simultaneously to all stages of the counter and tends to bring all the stages into the non-indicating or low current conduction state. At the same time, the stage which was previously in the indicating or high current conduction state still develops a transfer pulse which is impressed on the succeeding stage and has the effect to bring the succeeding stage into the indicating position. The only condition is that the magnitude and duration of the transfer pulse is such as to overcome the effect of the input pulse on the stage which is to be brought into the indicating condition.

Conventional ring counters employ either gas tubes or each stage may consist of a multivibrator including two vacuum tubes. Due to the long deionization time of a gas tube, fast counting is impossible with counters employing such tubes. On the other hand, a ring counter, where each stage consists of a multivibrator, requires a large number of vacuum tubes so that such counters become impractical as compared to a decade counter consisting of binary units having feed-back loops.

It is accordingly, a primary object of the present invention to provide an improved bistable transistor circuit suitable for use in ring counters and which is not subject to limitations inherent in prior known circuits of this type.

A further object of the invention is to provide a ring counter employing a single current multiplication transistor in each stage of the counter, which is both stable and reliable in operation without adjustment for relatively long periods of time.

Another object of the invention is to provide a ring counter of the type referred to, which is not sensitive to the amplitude of the trigger or transfer pulses.

Still a further object of the invention is to provide an improved transistor ring counter which permits high speed operation and visual indication of the counting process, which requires small power for operation, and no adjustment of the circuit constants.

A ring counter, in accordance with the present invention, consists of individual stages each employing a single current multiplication transistor arranged to be bistable. The transistor ring counter of the invention does not require priming, consequently each trigger pulse is impressed simultaneously on all the stages and tends to bring them all into the non-indicating condition. The transistor stage, which was previously in the indicating condition, develops a transfer pulse of sufficient amplitude to override the impressed trigger pulse and thus bring the succeeding stage into the indicating condition.

The transistor ring counter of the invention also employs a novel bistable triggered circuit. The bistable circuit of the invention is triggered by applying trigger pulses to the base of alternately opposite polarity. This circuit will operate in spite of widely varying characteristics of individual transistors without adjustment of the circuit constants.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2, 3:
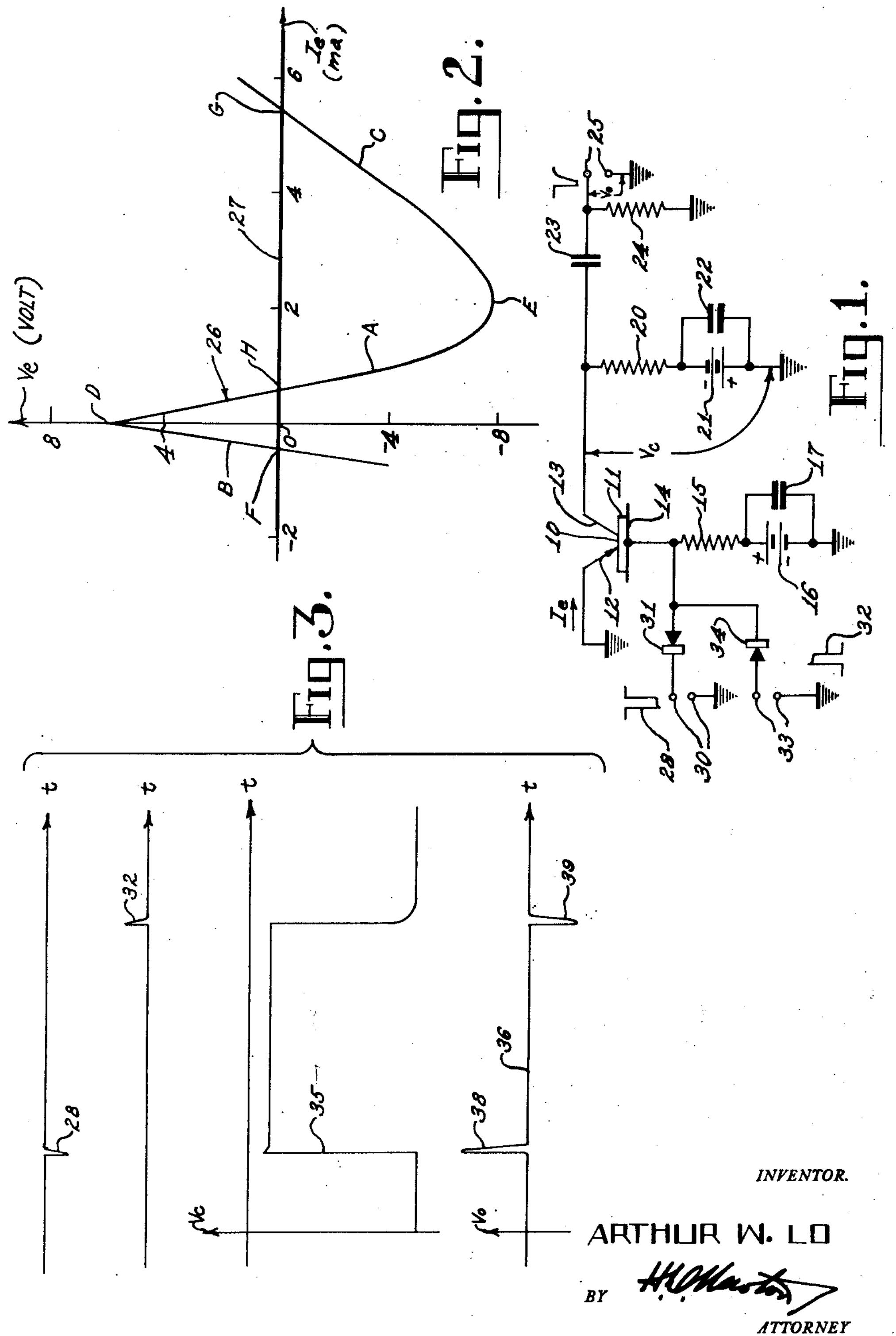
Figure 1 is a circuit diagram of a bistable triggered transistor circuit embodying the present invention.
Figure 2 is a graph illustrating the emitter current plotted as a function of the emitter to ground voltage of a bistable transistor circuit.
Figure 3 is a graph indicating trigger pulses and pulses developed at the collector and at the output of the circuit of Figure 1.

Referring now to the drawings in which like elements are designated by the same reference characters throughout the figures and particularly to Figure 1, there is illustrated a bistable triggered circuit including a transistor 10. Transistor 10 should be a current-multiplication transistor and may, for example, be a point contact transistor, that is, a transistor of the type where the emitter and collector electrodes are both in rectifying contact with the semi-conducting body 11. A current-multiplication transistor may be defined as a transistor where the short circuit collector current increments are larger than corresponding emitter current increments. The body 11 may consist of a semi-conducting material such as germanium and preferably is of the N type as will be assumed in the following discussion. Emitter 12, collector 13 and base 14 are in contact with body 11. The details of manufacture and the mode of operation of a point contact transistor are well known and need not be further described here.

Base resistor 15 is connected between base 14 and a suitable source of operating potential such as battery 16. Emitter electrode 12 is grounded as shown and battery 16 is poled so that it tends to apply a bias voltage in the reverse direction between emitter 12 and base 14. Accordingly, the negative terminal of battery 16 is grounded, while its positive terminal is connected through base resistor 15 to base 14. Battery 16 may be bypassed for alternating frequency currents by bypass capacitor 17. Collector resistor 20 is connected between collector 13 and a suitable source of operating potential such as battery 21. Battery 21 is poled to apply a bias voltage in the reverse direction between collector 13 and base 14 and hence, the positive terminal of battery 21 is grounded. Battery 21 may also be bypassed for alternating frequency currents by bypass capacitor 22.

The output pulses may be derived across collector resistor 20. Preferably, the output pulse is differentiated by a differentiating network including capacitor 23 and resistor 24 connected across collector resistor 20. A pair of output terminals 25 is connected across resistor 24.

The operation of the bistable circuit of Figure 1 may be explained by reference to Figure 2 where the emitter current $I_e$ is plotted against the emitter voltage $V_e$; the emitter current $I_e$ is indicated in Figure 1 and the emitter voltage $V_e$ indicates the voltage which appears looking into the emitter when the emitter circuit is opened. The characteristic curve 26 has a negative resistance portion A, which is bounded on either end by a positive resistance portion B and C respectively. The points D and E are the boundaries between the positive portion B and the negative portion A and between the negative portion A and the positive portion C respectively. Due to the fact that the emitter 12 is directly grounded, the load line is represented by the $I_e$ axis for which $V_e=0$ and is indicated by the heavy line 27. Consequently, points F and G representing the intersections of load line 27 with the positive curve portions B and C respectively indicate the stable operating conditions of the circuit of Figure 1. Point H indicating the intersection of the load line 27 with the negative curve portion A indicates an instable point of operation.

Let it now be assumed that the circuit of Figure 1 is in a condition corresponding to point F which indicates the low current conduction state of the circuit. It will now readily be seen that the circuit of Figure 1 may be triggered into its state of high current conduction corresponding to point G by applying a positive trigger pulse to the emitter 12. However, since the emitter is directly grounded, the trigger pulse cannot be applied to the emitter, but may, for example, be applied to the base 14. Hence, a negative trigger pulse as shown at 28 in Figure 1 may be applied to base 14 through input terminals 30, one of which is connected to base 14 through rectifier 31. It will be readily apparent that the negative trigger pulse 28 has the same effect as a positive trigger pulse applied to the emitter. Rectifier 31 is poled in such a direction as to be conducting for the negative trigger pulse 28.

Provided the negative trigger pulse 28 is of sufficient amplitude to drive the circuit past the point D the circuit will reach its high conduction state corresponding to point G.

It will also be readily apparent from Figure 2 that the application of a negative trigger pulse to the emitter will drive the circuit back into its state of low current conduction. The same result may be accomplished by a positive trigger pulse 32 applied to base 14 through input terminals 33, one of which is connected to base 14 through rectifier 34. Rectifier 34 is poled to become conducting upon the arrival of a positive trigger pulse 32. As long as the amplitude of trigger pulse 32 is sufficient to drive the circuit past point E, the circuit will return to its stable low current conduction state corresponding to point F. Successive trigger pulses of alternately opposite polarity applied to base 14 will drive the circuit of Figure 1 from one state of stable conduction to the other in the manner described above.

Figure 3 to which reference is now made indicates a negative trigger or set pulse 28 followed by a positive triggered or reset pulse 32. As explained hereinabove, in response to the arrival of the negative set pulse 28 the circuit will go into high current conduction. Curve 35 indicates the collector voltage $V_c$ (see Figure 1). In response to the set pulse 28, the collector voltage becomes less negative due to the larger collector current. Eventually, in response to the reset pulse 32, the circuit returns to its state of low current conduction and the collector voltage as shown by curve 35 becomes more negative.

The voltage fluxuations of the collector circuit as shown by curve 35 are transformed by the differentiation circuit comprising capacitor 23 and resistor 24. As is well known in the art, such a network operates only on the dynamic or changing portions of a voltage curve. Accordingly, there is impressed across the output terminals 25 a voltage having a wave form as shown by the curve 36 of Figure 3. The rising portion of curve 35 is operated on to produce a positive pulse 38. The negative going portion of curve 35 is operated on by the differentiating circuit to produce a negative pulse 39. It is noted that the polarity of the applied input pulses 28 and 32 with respect to the output pulses 28 and 32 with respect to the output pulses 38 and 39 is reversed.

It is further noted that the amplitude and width of the output pulses are independent of the amplitude and width of the input pulses and are respectively controlled by the selection of the collector voltage and the collector resistor 20, and the differentiating capacitor 23 and resistor 24.

Figure 4:
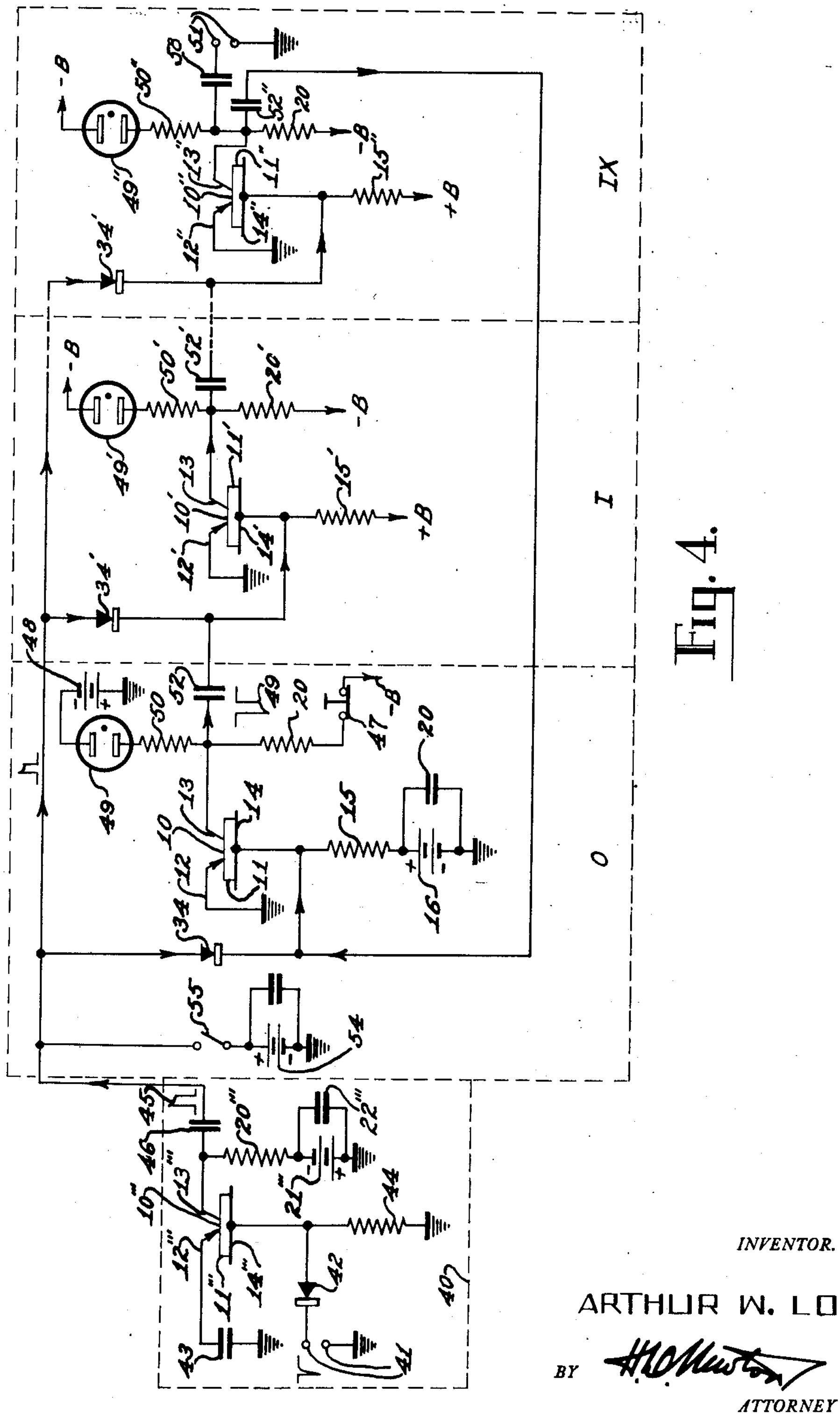
Figure 4 is a circuit of a transistor ring counter in accordance with the present invention.

Referring now to Figure 4 there is illustrated a ring counter circuit comprising three counter stages O, I and IX and a pulse standardization or input stage. The three stages of the ring counter are substantially identical and corresponding elements of the stages will be designated by characters having primed superscripts.

The pulse standardization stage is a regenerative amplifier as described and claimed in a copending application to A. W. Lo, Serial No. 296,586, entitled "Monostable Transistor Triggered Circuits" and will be described here only in such detail as is necesary to give a complete understanding of the presently presented counter circuit.

The input stage, which is included within the dotted square 40, is a monostable trigger circuit utilizing a current multiplication transistor as previously herein described. An external network interconnects the transistor electrodes with a common junction point such as ground and includes a base impedance element and a collector impedance element, which serves as the output load. A suitable source of operating potential such as a battery is provided in series with the base and collector elements to bias the collector in a reverse direction. The base impedance element may be a resistor and provides for regeneration as explained in the patent to Eberhard, 2,533,001.

An input source, which may, for example, provide negative trigger pulses which are to be counted, may be connected to the input terminals 41 of the input stage. The crystal rectifier 42, which is connected between one of the input terminals 41, and the base electrode 14''' is poled to be rendered conductive upon the application of a negative voltage to the input terminals 41. Hence, if the applied pulse is of a negative polarity, the base 14''' will be rendered more negative with respect to the emiter 12''' and consequently, the emitter current, which flows between capacitor 43, emitter 12''' and base 14''', will be in the direction as shown by the arrow. As long as this emitter current is greater than the emitter current during the stable low current conduction state, the circuit will be triggered into its unstable high current conduction state by the application of this negative trigger pulse. The emitter current will now further increase. Since we have assumed that the transistor 10''' is a current multiplication transistor, the corresponding increase in collector current will be larger than that of the emitter current. This large collector current flows through the base resistor 44 and the resulting voltage drop will drive the base voltage further in the negative direction. Consequently, since the voltage of the base 14''' is now more negative with respect to ground than the voltage across the input terminals 41, the rectifier 42 will cease to conduct and the pulse source is effectively disconnected from the circuit.

Due to the higher negative voltage which is now developed at the base 14''' of the transistor 10''' a still larger positive current flows through the emitter capacitor 43 into the emitter 12'''. Consequently, the emitter current, which previously had a value greater than the stable state condition due to the trigger pulse, suddenly increases due to this positive feedback action. This action causes the emitter capacitor 43 to become charged whereupon the emitter current decreases exponentially as the emitter capacitor 43 becomes charged. This causes the circuit to return to its stable low current conduction state. It is thus seen that the application of a negative trigger pulse to this circuit has temporarily caused the circuit to be driven into an unstable high current conduction state. It can readily be seen that this will produce in the collector circuit a voltage pulse as represented by the reset pulse 45 shown in Figure 4. This pulse is produced due to the increase in collector current which increase causes a greater voltage drop to appear across the collector resistor 20'''. This voltage drop, which is in a negative direction, produces a positive rise in the collector voltage. At the termination of the unstable state the collector current is again reproduced which causes the collector to return to its stable more negative condition. This is represented by the trigger pulse 45, which is shown as a positive voltage pulse.

It is noted at this time that the amplitude and width of the trigger pulse 45 is independent of the input pulse. Under one set of conditions where the coupling capacitor 46 was 0.1 microfarad, the collector resistor 20''' was 5,600 ohms and the bias voltage provided by the potential source 21''' was 45 volts, the trigger pulse 45 had an amplitude of approximately 10 volts.

The individual stages of the ring counter circuit are substantially identical to the single stage hereinabove described and illustrated in Figure 1 of the drawing. There are shown, however, certain modifications which are provided to enable resetting of the ring counter circuit, which will be described in connection with the overall operation of the ring counter.

The first stage of the ring counter which is enclosed within the dotted rectangle and designated by the reference character O comprises a transistor 10 having a body 11 of semi-conducting material, an emitter electrode 12 and a collector electrode 13 both of which are in rectifying contact with the body 11. There is provided a base electrode 14, which is in ohmic contact with the semi-conducting body 11. A collector resistor 20 is connected between the collector electrode 13 and a reset switch 47. The reset switch 47 in its normal state provides a connection between the collector resistor 20 and a negative source of bias potential indicated at —B which is not shown. This source of potential which is negative with respect to ground may be on the order of 45 volts. A base resistor 15 is connected between the base 14 and a source of potential 16, the negative terminal of which is connected to ground. This source of potential may be a battery as illustrated. Further, this source of potential may be bypassed for alternating current voltages by bypass capacitor 20. As previously described in Figure 1 the emitter electrode is connected directly to ground.

It is noted at this time that the battery 16 is poled in such a direction as to tend to apply a reverse bias between the emitter electrode 12 and the base electrode 14. However, this circuit, even when in its low current conduction stable state, has a base current which is sufficient to produce across the base resistor 15 a voltage drop which is only slightly less than the voltage of the battery 16. The direction of the voltage drop across the base resistor 15 is such as to oppose the voltage produced by the battery 16. Accordingly, the actual voltage existing between the base electrode 14 and the emitter electrode 12 will be in a reverse direction when the circuit is in a stable low current conduction state. When the circuit is in a stable high current conduction state the voltage drop, which appears across the base resistor 15, will normally be of sufficient magnitude to overcome the voltage of the battery 16, thus presenting between the base electrode 14 and the emitter electrode 12 a potential which is in the forward direction. Hence, it may be said that the potential provided by the battery 16 is in such a direction so as to tend to produce a reverse bias between the base electrode 14 and the emitter 12, but in actual fact the resulting bias due to operation of the circuit may be in either direction.

It has been found that the placing of the potential source in the base lead of the circuit results in far more stable operating characteristics than could otherwise be obtained. In circuitry heretofore disclosed, it has been usual to place a potential source between the emitter electrode and ground to provide a steady state bias between the emitter electrode and base electrode. However, this source of potential had to be very critically adjusted with a change of transistor characteristics. This was especially true if the potential source was poled to provide a reverse bias between these electrodes.

It is noted that by placing the source of fixed potential in the base lead, any change in transistor characteristics is automatically compensated for by the degenerative effect of the base resistor. If due to a change in transistor characteristics the D.-C. base current would tend to increase, the bias, which would appear between the base electrode and emitter electrode is automatically adjusted by an increase in the voltage drop appearing across the base resistor. It should, therefore, be obvious that this improvement in accordance with the present invention has provided a far more stable circuit, which is capable of accepting transistors of varying characteristics, and at the same time, providing a circuit which will have stable operating characteristics.

In order to provide a visual indication of the ring counter stage, which is in a high current conduction state, a source of potential 48, a visual indicator 49, such as a neon tube and a current limiting resistor 50, are connected in series arrangement between the collector electrode 13 and ground. As illustrated, this source of potential 48 may be a battery and is chosen to have a potential such that when the collector circuit is in a stable low current conducting state, the potential drop across the visual indicator 49 is below that which is required to produce ionization, but when the collector circuit is caused to be in a state of high current conduction which will cause the collector electrode to be driven to a more positive condition, a voltage drop across the neon tube 49 will be increased to a point which is sufficient to cause ionization, thereby giving a visual indication of the high current conduction state of the stage to which it is connected.

Each of the ring counter stages is provided with a unidirectional conducting device such as a crystal rectifier 34. This rectifier 34 is connected between the base electrode 14 and the coupling capacitor 46 of the input stage and is poled in such a direction to be conductive upon the application of a positive pulse. It is noted that as hereinbefore described in connection with Figure 1, the application of a positive pulse to the base electrode 14 will cause the ring counter stages, if not before in such a condition, to be driven into a low current conduction stable state. Since each of the stages is so connected, a trigger pulse from the input stage will tend to drive all of the stages of the ring counter into this low current stable state.

If one of the stages, such as O, is in a stable high current conduction state, the application of such a trigger pulse to the base electrode will cause a large negative output or transfer pulse 49 to be produced across the collector resistor 20. If the transfer pulse 49 is of sufficient magnitude to override the trigger pulse 45, the succeeding stage will receive a net pulse which is negative and as described and illustrated in Figure 3 of the drawing, a negative pulse applied to the base electrode of one of the stages will cause that stage to be driven into a stable high current conduction state. It is thus seen that the application of a pulse to the input terminals 41 of the pulse standardization stage 40 will cause the stable high current conduction state of a stage of the ring counter circuit to be advanced to the next succeeding stage. This process can be continued by the application of pulses to the input terminals 41 to alternately place each of the individual stages of the ring counter in a state of high current conduction.

As shown in the drawing, the stage which is indicated by the reference character IX is provided with an output capacitor 58 and a pair of output terminals 51. The output capacitor 58 is provided in addition to the coupling capacitor 52 which is connected between the collector electrode 13'' and the base electrode 14 of the ring counter stage O. It is readily seen, therefore, that each time stage IX is driven to a high current conduction state and then to a low current conduction state, that an output pulse will appear across the output terminals 51 and at the same time, the ring counter action will be transferred from stage IX to stage O.

In order to place the ring counter in a given initial condition, there is provided a source of potential 54 and an erase switch 55. The erase switch 55, which is normally open, and the source of potential 54 are connected in series arrangement between the junction of capacitor 46 and the crystal rectifier 34 and ground. The closing of the erase switch will apply a positive potential through a crystal rectifier 34 to the base electrodes 14, thus placing all of the stages of the ring counter in a stable low current conduction state. The erase switch need be only momentarily closed to produce this result. Then, upon the disconnection of the reset switch 47, the ring counter stage O will be placed in a stable high current conduction state. This is due to the temporary rising of the collector voltage as the collector circuit is disconnected from the negative source of bias potential. Since the ring counter stage O is the only stage which can be in a high current conducting state after the above described operation, the application of trigger pulses from the input stage will give a true indication beginning with the conduction of the ring counter stage I upon the application of the first trigger pulse from the input stage.

It has been found that a ring counter constructed in the manner taught by this invention is capable of stable, reliable operation when utilizing transistors having a variety of characteristics. It was possible to maintain this ring counter in operation after changing transistors from one stage to another or after replacing individual transistors by transistors from another source.

By way of example, some of the values of circuit components, which may be used, are as follows:

| | | |
|---|---|---|
| Base resistor | ohms | 18,000 |
| Collector resistor | do | 5,600 |
| Coupling capacitor | micro-microfarads | 470 |
| Emitter-base bias potential | volts | +45 |
| Collector-base bias potential | do | −45 |

With these values it was found that the transfer pulse from the individual ring counter stages was in the order of 25 to 30 volts, whereas the reset pulse from the input stage was in the order of 5 to 10 volts. These magnitudes were provided in order to insure that the negative or transfer pulse from the ring counter stages would be of sufficient amplitude to override the trigger pulse, thereby providing positive operation of the ring counter by insuring that the next succeeding stage would be placed in a state of high current conduction.

There has thus been described a ring counter circuit capable of providing reliable operation which is insensitive to amplitude variations of the input or counted pulses. There is an economy in the number of transistors utilized, as only one transistor is necessary for each bistable circuit. The device is further capable of high speed operation and provides a simple visual indication device with no complicated resistance matrix. Further, in view of the fact that the device operates solely with the use of transistors, very small operating power is required and a long stable life is provided.

What is claimed is:

1. A bistable triggered circuit comprising a current-multiplication transistor including a semi-conducting body, a base electrode, an emitter electrode and a collector electrode in contact with said body, an external network interconnecting said electrodes with a common junction point and including a first impedance element and a first source of operating potential in series arrangement connected between said base electrode and said junction point, a second impedance element and a second source of operating potential in series arrangement connected between said collector electrode and said junction point, said sources of operating potential being respectively poled to apply reverse bias between said collector electrode and said base electrode, said emitter electrode being conductively connected directly to said junction point, means providing an output circuit connection across said second impedance, and means connected across said first impedance element for providing an input connection, said bistable triggered circuit thereby having a stable state of low current conduction and a stable state of high current conduction.

2. A bistable triggered circuit as defined in claim 1 wherein said first impedance element is a resistor.

3. A bistable triggered circuit as defined in claim 1 wherein said second impedance element is a resistor.

4. A bistable triggered circuit as defined in claim 1 wherein said input circuit includes a semi-conducting device.

5. A bistable triggered circuit comprising a current multiplication transistor including a semi-conducting body, a base electrode, an emitter electrode and a collector electrode in contact with said body, a first source of operating potential having a negative terminal and a positive terminal, said negative terminal of said first source of operating potential being connected to a reference point, a base resistor connected between said positive terminal of said first source of operating potential and said base electrode, a second source of operating potential having a negative terminal and a positive terminal, said positive terminal of said second source of potential being connected to said reference point, a collector resistor connected between said collector electrode and said negative terminal of said second source of operating potential, said emitter electrode being connected directly to the junction of the positive terminal of said second source of potential and the negative terminal of said first source of operating potential, first and second rectifying elements each having a cathode and an anode, the anode of said first rectifying element and the cathode of said second rectifying elements being connected to said base electrode, a first input means connected to the cathode of said first rectifying element, a second input means connected to the anode of said second rectifying element, and an output circuit connected across said collector resistor, said circuit thereby having a stable state of high current conduction and a stable state of low current conduction.

6. A ring counter comprising a plurality of counter stages connected in a closed loop and an input stage, each of said counter stages having only an indicating and a non-indicating condition and comprising a semi-conducting body, a base electrode, an emitter electrode, and a collector electrode in contact with said body, a base impedance element connected between each base electrode and a source of substantially fixed positive potential, a collector impedance element connected between each collector electrode and a source of fixed negative potential, each emitter electrode being connected to a point of fixed reference potential, means for applying trigger pulses simultaneously across said base impedance elements for triggering all of said counter stages into their non-indicating conditions, and transfer means connected between each stage and the succeeding stage for triggering the succeeding stage into its indicating condition when the preceding stage is triggered into its non-indicating condition.

7. A ring counter comprising a plurality of counter stages connected in a closed loop and an input stage, each of said stages having only a stable low and high state of current conduction and comprising a semi-conducting body, a base electrode, an emitter electrode and a collector electrode in contact with said body, an impedance element connected between each of said base electrodes and a point of substantially fixed positive potential, a collector impedance element connected between said collector electrodes and a point of substantially fixed negative potential, said emitter electrode being directly conductively connected to a point of fixed reference potential, means including said input stage for applying trigger pulses simultaneously between said emitter and base electrodes of each of said counter stages for triggering all of said counter stages into their stable low current conduction state, and transfer means connected between the collector electrode of each of said counter stages and the base electrode of the succeeding stage for transforming said succeeding stage into its stable high current conduction state when said stage connected thereto is triggered into its state of stable low current conduction by one of said trigger pulses.

8. A ring counter comprising a plurality of counter stages connected in a closed loop and an output stage, each of said counter stages having only a stable low and high state of current conduction and each including a transistor circuit having a point of fixed reference potential therein and a transistor having a semi-conducting body, a base electrode, an emitter electrode, and a collector electrode in contact with said body, first means connected between the base electrode and said point of fixed potential for applying a voltage in the reverse direction between each emitter electrode and its associated base electrode when said stage is in stable low current conduction state and for applying a voltage in the forward direction when said stage is in a stable high current conduction state, second means connected between each collector electrode for applying a voltage in the reverse direction between each collector electrode and its associated base electrode, input means including said input stage for applying trigger pulses simultaneously between the emitter and base electrodes of each of said counter stages for triggering all of said counter stages into their stable low current conduction state, and transfer means connected between the collector electrode of each of said counter stages and the base electrode of the succeeding stage for transforming said succeeding stage into its stable high current conduction state when said stage connected thereto is triggered into its state of stable low current conduction by one of said trigger pulses.

9. A ring counter comprising a plurality of counter stages connected in a closed loop and an input stage, each of said counter stages having only a low and a high stable state of current conduction and each including a transistor circuit having a point of fixed reference potential therein and a transistor having a semi-conducting body, a base electrode, an emitter electrode and a collector electrode in contact with said body, each emitter electrode being directly connected to said point of fixed reference potential, a first impedance element and a first source of operating potential in series arrangement connected between each base electrode and said point of reference potential, a second impedance element and a second source of operating potential connected in series arrangement between each collector electrode and said point of fixed reference potential, said first impedance and said sources of operating potential being operative to provide a forward bias between each emitter electrode and its associated base electrode when said stage is in a stable high current conduction state and a reverse bias when said stage is in a stable low current conduction state, said sources of operating potential being poled to provide a reverse bias between each collector electrode and its associated base electrode, means including said input stage coupled to the first impedance elements for applying trigger pulses simultaneously between said emitter and base electrodes of each of said stages for triggering all of said counter stages into their stable low current conduction state, and reactive means connected between the collector electrode of each of said counter stages and the base electrode of the succeeding stage for transforming said succeeding stage into its stable high current conduction state when said stage connected thereto is triggered into its state of stable low current conduction by one of said trigger pulses.

10. A ring counter as defined in claim 9 wherein said first impedance element is a resistor.

11. A ring counter as defined in claim 10 wherein said second impedance element is a resistor.

12. A ring counter as defined in claim 11 wherein said input stage comprises a monostable transistor circuit.

13. A ring counter as defined in claim 12 wherein said reactive means is a capacitor.

14. A ring counter comprising a plurality of counter stages connected in a closed loop and an input stage, each of said counter stages comprising a bistable transistor circuit having a low and a high stable state of current conduction and including a semi-conducting body, a base electrode, an emitter electrode, and a collector electrode in contact with said body, a collector impedance element, a source of operating potential and a base impedance element connected in series arrangement in the order named between each collector electrode and its associated base electrode for applying a bias in the reverse direction between each collector electrode and said associated base electrode, each emitter electrode being directly conductively connected to an intermediate point of said source of operating potential, unidirectional conducting elements connected between each base electrode and said input stage for applying trigger pulses simultaneously between each base electrode and its associated emitter electrode for triggering each of said counter stages into its stable low current conduction state, means connected between each collector electrode and the base electrode of the succeeding stage whereby a transfer pulse is applied to the succeeding stage when the stage connected thereto is triggered from a stable low current conduction state thereby placing said succeeding stage in a stable state of high current conduction, an output circuit coupled across the collector impedance of one of said counter stages, erase means connected to said unidirectional conducting elements for simultaneously triggering said counter stages to their stable low current conduction state, and reset means connected in the collector electrode circuit of another of said stages for triggering said another stage into its stable high current conduction state, whereby said ring counter is prepared for the receipt of and the accurate count of pulses from an input source.

15. A ring counter as defined in claim 14 wherein said collector impedance element is a resistor.

16. A ring counter as defined in claim 15 wherein said base impedance element is a resistor.

17. A ring counter as defined in claim 16 wherein said unidirectional conducting element is a rectifier poled so as to allow the application of negative pulses to the base electrodes of each of said counter stages.

18. A ring counter as defined in claim 17 wherein said means connected between the collector electrodes and the base electrode of the succeeding stage is a capacitor.

19. A ring counter as defined in claim 18 wherein said input stage is a monostable transistor circuit.

ARTHUR W. LO.

No references cited.